(12) United States Patent
Suwalski et al.

(10) Patent No.: US 12,440,141 B2
(45) Date of Patent: Oct. 14, 2025

(54) MEASURING ELECTRODE FOR ECG EPICARDIAL MONITORING AND MEASURING SYSTEM FOR ECG EPICARDIAL MONITORING COMPRISING SUCH ELECTRODE

(71) Applicant: QUANTUM INNOVATIONS SP. Z O.O., Warsaw (PL)

(72) Inventors: Grzegorz Suwalski, Warsaw (PL); Malgorzata Jakubowska, Warsaw (PL); Daniel Janczak, Pruszkow (PL); Sandra Lepak Kuc, Warsaw (PL); Przemyslaw Furdal, Warsaw (PL)

(73) Assignee: QUANTUM INNOVATIONS SP. Z O.O., Warsaw (PL)

( * ) Notice: Subject to any disclaimer, the term of this patent is extended or adjusted under 35 U.S.C. 154(b) by 426 days.

(21) Appl. No.: 17/996,693

(22) PCT Filed: Apr. 20, 2021

(86) PCT No.: PCT/PL2021/050027
§ 371 (c)(1),
(2) Date: Oct. 20, 2022

(87) PCT Pub. No.: WO2021/215945
PCT Pub. Date: Oct. 28, 2021

(65) Prior Publication Data
US 2023/0218220 A1   Jul. 13, 2023

(30) Foreign Application Priority Data
Apr. 20, 2020   (PL) .......................................... 433596

(51) Int. Cl.
*A61B 5/283*   (2021.01)
*A61B 5/259*   (2021.01)
(Continued)

(52) U.S. Cl.
CPC .............. *A61B 5/283* (2021.01); *A61B 5/259* (2021.01); *H01B 1/04* (2013.01); *H01B 5/14* (2013.01); *A61B 2562/0215* (2017.08)

(58) Field of Classification Search
None
See application file for complete search history.

(56) References Cited

U.S. PATENT DOCUMENTS

2010/0204560 A1 * 8/2010 Salahieh .................. A61B 5/01 606/41
2017/0042614 A1 * 2/2017 Salahieh ............ A61B 1/00082
(Continued)

FOREIGN PATENT DOCUMENTS

CN    109350846 A    2/2019
WO   2014139194 A1   9/2014

OTHER PUBLICATIONS

International Search Report, dated Mar. 8, 2021, for International Application No. PCT/PL2021/050027.
(Continued)

*Primary Examiner* — Michael W Kahelin
(74) *Attorney, Agent, or Firm* — SALIWANCHIK, LLOYD & EISENSCHENK

(57) ABSTRACT

The invention relates to a measuring probe for epicardial ECG monitoring comprising the measuring element (2) for measuring an electric signal from a heart and the connecting element (3) arranged to output the measured heart signal, the measuring element (2) being electrically connected with the connecting element (3). The measuring element (2) and the connecting element (3) are layered elements. The invention relates also to a measuring system for epicardial ECG monitoring comprising the probe (1) connected by the signal cable (5) with a display device.

26 Claims, 11 Drawing Sheets

(51) Int. Cl.
*H01B 1/04* (2006.01)
*H01B 5/14* (2006.01)

(56) References Cited

U.S. PATENT DOCUMENTS

| | | | |
|---|---|---|---|
| 2018/0353753 A1* | 12/2018 | Vetter | ................. A61N 1/0558 |
| 2020/0054273 A1 | 2/2020 | Lu et al. | |
| 2020/0060614 A1 | 2/2020 | Hatakeyama et al. | |
| 2022/0145027 A1* | 5/2022 | Kato | ....................... C08J 5/248 |

OTHER PUBLICATIONS

Machine translation of CN109350846A (Feb. 19, 2019).
Machine translation of WO2014139194A1 (Sep. 18, 2014).

* cited by examiner

MEASURING ELECTRODE FOR ECG EPICARDIAL MONITORING AND MEASURING SYSTEM FOR ECG EPICARDIAL MONITORING COMPRISING SUCH ELECTRODE

CROSS-REFERENCE TO RELATED APPLICATIONS

This application is the U.S. national stage application of International Patent Application No. PCT/PL2021/050027, filed Apr. 20, 2021, which claims the benefit under 35 U.S.C. § 119 of Polish Application No. P.433596, filed Apr. 20, 2020, the disclosures of each of which are incorporated herein by reference in their entirety.

BACKGROUND ART

The invention relates to a measuring probe for epicardial ECG monitoring acquiring a signal directly from the surface of a beating heart for monitoring and assessing condition of the heart during an operative procedure, in particular during a coronary artery bypass grafting performed by a technique on the beating heart, including the off-pump technique, which allows to acquire a signal precisely and uninterruptedly during an operation involving change in natural heart position, and a measuring system for epicardial ECG monitoring comprising such a probe.

Devices, which allow to acquire patient's ECG signal during an operative procedure both by placing electrodes on the patient's skin surface and directly on the heart, are known in the art.

The document PL213307B1 describes a system and device for monitoring of the heart during cardiosurgery, wherein electrodes are placed directly on the surface of the patient's heart. The device finds application in assessing condition the cardiac muscle at an operative site area, stabilized by a heart stabilizer and optionally a heart positioner. The system comprises the heart stabilizer with chambers and aspirating channels, connected to a suction pump and measuring electrodes, connected through a measuring interface with a measuring block having an immittance measuring module, connected to a control and data acquisition system.

The device described in the patent document PL213307B1 is a system of electrodes applied on a working surface of suckers in the heart stabilizer arms, that is the device is attached to the heart surface by a negative pressure. The negative pressure exerted on the heart surface can result in creating local blood extravasation. The device measures an immittance (tissue impedance). Tissue impedance is not a parameter analyzed by a cardiomonitor as a myocardial ischaemia parameter.

The document US2014206973A1 describes a system and device for remote monitoring of physiological parameters of the cardiovascular system, and a method of placing sensors on the heart surface, which requires "pinching" (puncturing) the tissue and/or vacuum elicited adhesion. It is a device for continuous, permanent (long-term) monitoring of signals from the heart surface, but it does not allow to display an ECG signal in real time on a standard cardiomonitor, especially during open-chest surgery. The described device is adapted to transmit an ECG signal by a wireless way to another device which records the acquired signal for its analysis after saving. The target group for utilizing such a device are patients with myocardial failure and cardiac arrhythmia. Use of the device in cardiosurgery was not described.

The device described in the patent document US2014206973A1 is not adapted for recording a signal with an open chest and non-anatomical position of the heart. In the case of a closed chest it is not possible to rotate the heart—to change its position the way it is changed during coronary artery bypass grafting surgery. The described device is supplied by a nonsurgical—transdermal technique. The described construction of the device requires its connection to a signal recording (saving) device, which is implanted subdermally. The described device is adapted for transmitting an ECG signal by a wireless technique to another device, which records the acquired signal for its analysis after saving. The requirement of wireless signal transmission precludes its functioning in operating conditions (in an operating room). Removal of the described device from the heart surface can result in bleeding due to earlier intervention into an epicardial tissue (e.g. from epicardial veins). Additionally, the description indicates the necessity of providing physical fixing means to the electrode to maintain it on the heart surface, the means being for instance negative pressure. Negative pressure put on the heart surface can adversely influence the structure of an epicardial tissue by causing local extravasation (haematoma) to the cardiac tissue or to pericardium. The described device cannot be relocated on the heart surface without interrupting tissue continuity, since each time tissue puncture or appearance of haematoma due to the negative pressure may occur—any relocation of the device is connected with risk of bleeding and increases tissue damage. Moreover, a relocation of the described device requires handling (tending) a physical fixing means (a negative pressure) delivery system. Each of the maneuvers requires time and performing additional actions.

Moreover, operating the system described in the document US2014206973A1 may require inserting an electrode through a vessel into the heart, and no heart maneuvering is recommended with an electrode inserted within the heart, as such an electrode located within the cardiac cavity can puncture or damage a heart wall. A method of signal acquisition presented in the described device is performed within the tissue, rather than on its surface. It is thus an intramural rather than epicardial measurement. The described device monitors the anterior wall of a heart only. The device cannot be mounted at posterior wall of the heart, since the mere weight of the heart could cause greater tissue injury by the needle, its coming out, or cause dysfunction of the negative pressure fixing system.

The solutions known from the prior art do not provide flexibility in positioning elements which acquire a signal. The solution of the document PL213307B1 provides a system, wherein the electrodes are positioned on the surface of the heart stabilized in a fixed position, without any possibility of maintaining contact of the electrodes with the heart while changing position of the heart, while the device of the document US2014206973A1 is an invasive device designed to be carried by the patient for a long time, and in addition the system and device disclosed in the document US2014206973A1 is not applied directly to the patient's heart.

The device described in the patent application US2010/204560 A1 is a tissue electrode assembly that includes a membrane configured to form an expandable, conformable body that is deployable in a patient. The assembly further includes a flexible circuit positioned on a surface of the membrane and comprising at least one base substrate layer, at least one insulating layer and at least one planar conducting layer. An electrically-conductive electrode covers at least a portion of the flexible circuit and a portion of the surface of the membrane not covered by the flexible circuit, wherein the electrically-conductive electrode is foldable upon itself with the membrane to a delivery conformation having a diameter suitable for minimally-invasive delivery of the assembly to the patient. The flexible electrodes can be used to sense, map, ablate, or stimulate muscles and/or nerves. Energy transmission through the electrodes can be accomplished over large surfaces such as selected portions of tissue such as the lining within an organ or at a particular structure in its entirety, for example, a discrete tumor mass.

Moreover, none of the solutions known in the art offers a device having dimensions providing, when placed on the heart surface, an easy access to the organ without covering a major part of its area.

The ECG monitoring is necessary in many cases, one of such cases being the coronary artery bypass grafting surgery. Such operations are routinely performed on patients with advanced coronary artery atherosclerosis, with a number of such operations still growing, among other things, due to aging of the society. Until recently, the traditional technique of performing such operations assumed the temporary replacement of heart and lung action with an extracorporeal circulation machine, however in consideration of a number of postoperative complications a technique based on performing the artery bypass grafting surgery on the beating heart, without use of extracorporeal circulation (off-pump coronary artery bypass grafting—OPCAB) is used more and more widely. This technique allows to reduce mortality and number of complication as compared to the traditional technique for some groups of patients, however it requires temporary alteration of the beating heart position to expose particular walls and coronary arteries of the heart, action known as the heart maneuvering. During the maneuvering with the beating heart, a very precise electrocardiographic monitoring is necessary to diagnose rapidly all cardiac rhythm disturbances, heart blood supply, and to take up adequate preventive measures. Standard monitoring of patients undergoing a surgery includes i.a. an electrocardiographic recording (ECG).

Exemplary standard techniques of the heart ECG monitoring were described above, but they are not suitable for operations utilizing the OPCAB technique. A solution is missing, which would examine an electrocardiographic record in real time sequentially from above the region of each bypassed coronary artery during the entire sequence of bypass performing, and the ECG signal would be output from an operative area to a standard cardiomonitor located in an operating room.

All the prior art solutions described above and that employed conventionally in clinical practice do not ensure correct, continuous, diagnostic ECG monitoring during the coronary artery bypass grafting surgery performed on the beating heart with a change in the natural position of the heart. Loss of possibility to correctly record ECG through electrodes located on the patient's skin during such operation may occur for the following reasons:

loss of contact of the heart with the surrounding tissues due to changes in its natural position;
introducing materials to the patient's chest which isolate the heart from surrounding tissues.

Loss of a signal sufficient for monitoring condition of the heart precludes precise monitoring of a potential cardiac ischaemia, making it impossible to undertake maneuvers relieving a hazard for patient's life.

Presently, there is no available solution (device) for measuring ECG directly from the heart surface. Cardiosurgery employs electrodes temporarily driven into the cardiac tissue (wall), which act to stimulate the heart, rather than to record the ECG signal. Such electrodes penetrate the cardiac tissue. Their use for optional ECG signal reading would be connected with repeated puncturing of the cardiac tissue, which could provoke bleeding. Additionally, the electrode provided with a needle on its tip, on its removal from the cardiac tissue could cause its disruption and further bleeding. Next, possible use of electrodes punching the cardiac tissue followed by cutting a needle after their application is still connected with a risk of bleeding, and also a necessity to employ many electrodes—a fresh electrode for each fresh location. Therefore, this variant would likewise lead to repeated puncturing of the cardiac tissue and a risk of bleeding.

The present invention allows acquiring an ECG signal from the heart surface, which is non-invasive and safe for the heart, even in the case of necessary numerous changes in the heart position during surgery, not occupying a large area of the heart at the same time.

SUMMARY OF THE INVENTION

A measuring probe for epicardial ECG monitoring, is characterized in that it comprises a measuring element for measuring an electric signal from the heart, and a connecting element arranged to output the measured heart signal through a connecting fragment, the measuring element being electrically connected with the connecting element. The measuring element is a layered element comprising a signal-collecting layer distributed on at least a part of the measuring element, and a base layer extending over the entire surface of the measuring element. The connecting element is a layered element comprising a conductive layer, a dielectric layer insulating the conductive layer, and a base layer extending over the entire surface the connecting element. The connecting fragment provided at the end of the connecting element, opposite to the measuring element, is a layered element comprising a conductive layer and a base layer. The maximum dimension of the measuring element perpendicular to the thickness is 30 mm.

Preferably, the measuring element between the signal-collecting layer and the base layer comprises the conductive layer, while in the connecting element, over the dielectric layer the conductive layer is arranged, over which the base layer is located, the conductive layer of the measuring element and the conductive layer of the connecting element constituting a continuous conductive layer extending across the measuring element and the connecting element.

Preferably, in the measuring element, the base layer is located over the signal-collecting layer, and in the connecting element, the base layer is located over the conductive layer which is arranged over the dielectric layer.

Preferably, in the measuring element, the base layer is located over the signal-collecting layer, and in the connecting element, the base layer is located over the conductive layer which is arranged over the dielectric layer, the signal-collecting layer of the measuring element and the conductive layer of the connecting element constituting a continuous layer extending across the measuring element and the connecting element.

Preferably, in the measuring element the base layer is located over the signal-collecting layer, while in the connecting element, over the dielectric layer, the conductive layer is arranged, over which the base layer is located, the conductive layer of the connecting element at the section adjacent to the measuring element being made of the same material as the signal-collecting layer of the measuring element, while the remaining portion being made of another conductive material.

Preferably, the signal-collecting layer of the measuring element is also an adhesive layer which allows to fix the probe.

Preferably, the signal-collecting layer of the measuring element overlaps partially the dielectric layer of the connecting element.

Preferably, in the measuring element the signal-collecting layer is located over the adhesive layer.

Preferably, the measuring element comprises the adhesive layer located at the perimeter of the measuring element, partially covering the signal-collecting layer.

Preferably, in the measuring element the adhesive layer is a graphene-TPU layer.

Preferably, the conductive layer in the connecting element is a graphene-PMMA layer.

Preferably, the signal-collecting layer in the measuring element is a graphene layer.

Preferably, the conductive layer in the connecting element is a graphene layer.

Preferably, the conductive layer is at least partially a silver layer.

Preferably, the measuring element in the plane perpendicular to its thickness has a circle-like shape.

Preferably, the connecting element in the plane perpendicular to its thickness has a rectangular shape.

Preferably, the measuring element and the connecting element are located in the same plane.

Preferably, all the layers are made of flexible materials.

Preferably, the dielectric layer and the base layer are made of the same material.

Preferably, the adhesive layer has an annular shape.

Preferably, the connecting element is connected with a signal cable through the connecting fragment.

Preferably, the signal-collecting layer comprises at least one carrier, a conductive substance and optionally at least one adhesion promoter.

Preferably, the adhesion promoter comprises one substance selected from: lanolin, agar, sodium alginate, collagen, gelatin, and starch and cellulose, and derivatives thereof, such as carboxymethyl cellulose, carboxymethyl starch, hydroxypropyl starch or a mixture thereof.

Preferably, the conductive substance is at least one selected from: Au, Ag, PdAg, graphite, graphene, $RuO_2$, $IrO_2$, $Bi_2Ru_2O_7$, ITO or a mixture thereof.

Preferably, the carrier is a polymer compound with a solvent, or a resin with a solvent.

Preferably, the polymer is one from: ethylcellulose, polypropylene, polyethylene, polyesters and polystyrenes, poly(methyl methacrylate) (PMMA), a thermoplastic polyurethane elastomer (TPU), polylactic acid (PLA) or a mixture thereof.

Preferably, the solvent is one selected from: acetone, dimethylformamide (DMF), butyl carbitol acetate (OKB), chloroform or a mixture thereof.

Preferably, the graphene-TPU layer comprises graphene, hydroxypropyl starch and a thermoplastic polyurethane elastomer in dimethylformamide.

Preferably, the graphene-TPU layer comprises 10% by weight of sodium graphene, 10% by weight of hydroxypropyl starch and 80% of a thermoplastic polyurethane elastomer in dimethylformamide.

Preferably, the graphene-PMMA layer comprises graphene, and poly(methyl methacrylate) in butyl carbitol acetate.

Preferably, the graphene-PMMA layer comprises 13% by weight of graphene and 87% by weight of poly(methyl methacrylate) in butyl carbitol acetate.

Preferably, the graphene layer comprises sodium alginate, graphene and poly(methyl methacrylate) in butyl carbitol acetate.

Preferably, the graphene layer comprises 10% by weight of sodium alginate, 13% by weight of graphene and 77% by weight of poly(methyl methacrylate) in butyl carbitol acetate.

Preferably, the graphene layer comprises poly(methyl methacrylate) in butyl carbitol acetate, graphene and/or agar.

Preferably, the silver layer comprises silver microflakes in a matrix.

Preferably, the silver layer comprises 70% by weight of the silver microflakes and 30% by weight of poly(methyl methacrylate) in butyl carbitol acetate.

Preferably, the matrix comprises a solution of poly(methyl methacrylate) in butyl carbitol acetate.

Preferably, the dielectric layer comprises a dielectric paste.

Preferably, the adhesive layer comprises a polymer and an adhesion promoter.

Preferably, the polymer is one from: ethylcellulose, polypropylene, polyethylene, polyesters and polystyrenes, poly(methyl methacrylate) (PMMA), a thermoplastic polyurethane elastomer (TPU), polylactic acid (PLA) and a mixture thereof.

Preferably, the adhesion promoter is at least one substance from: lanolin, agar, sodium alginate, collagen, gelatin, and starch and cellulose, and derivatives thereof, such as carboxymethyl cellulose, carboxymethyl starch, hydroxypropyl starch or a mixture thereof.

Preferably, the base layer is one material from: polyethylene terephthalate (PET), polyethylene naphthalate (PEN), polyetheretherketone (PEEK), polycarbonate (PC), polyethersulfone (PES), polarylate (PAR), polycyclic olefin (PCO) or polynorbornene (PNB), polyimide (PI), a fluoric polyester or copolymers thereof.

Preferably, individual layers of the measuring element and the connecting element are made by a process of printing on the base layer.

Preferably, the measuring element diameter is between 10 mm and 30 mm Preferably, the thickness of the dielectric layer, signal-collecting layer, connecting layer is in the range of 10-15 μm.

Preferably, the thickness of the base layer is in the range of 40-75 μm.

Preferably, the thickness of the graphene-containing layer is in the range of 10-30 μm.

A measuring system for the epicardial ECG monitoring comprising the probe according to an of the above examples.

Preferably, the system comprises a signal cable connecting the probe with a display device.

Preferably, the connecting fragment for connecting with the signal cable is located at an end of the connecting element of the probe, opposite to the measuring element of the probe.

Preferably, the display device comprises the cardiomonitor.

Thanks to the probe according to the invention, it is possible to maintain monitoring of an ECG signal of a diagnostic value during surgery, also on a heart placed in an unnatural position or surrounded by surgical isolating materials, to provide possibility of optimal positioning of the heart without fear of losing signal from the probe in any position and from any wall of the heart, and allows medics performing the surgery more unrestrained movement in the operating field. Additionally, using the probe, namely continuous monitoring of the perfusion of the patient's heart, provides continuous information for the surgery team. Possession of such information may reduce pressure on a surgery team to perform the surgery as fast as possible. It was reported in a number of scientific papers that such pressure may influence the quality of the surgery being performed and optimal number of bypasses made in coronary arteries. The probe according to the invention further allows monitoring the heart wall other than the one undergoing revascularization. Moreover, the probe can be re-stuck in any moment in another place on the heart, which is useful in the case of occurrence of heart dysfunction during performing, for example, a shunt to coronary artery, and the previous position of the probe does not indicate ischaemia in the bypassed region of the heart. At such time the probe can be quickly re-stuck in another location on the heart (e.g. the opposite wall), and consequently a fast, precise intraoperative diagnostics is available. Such situation may occur when position of the heart prepared for the bypass grafting of a given artery will cause disturbances in blood flow in a coronary artery at the opposite (other) side of the heart.

All of the above-described benefits allow to start actions which anticipate results of a cardiac ischaemia appearing during the coronary artery bypass grafting, and to reduce risk of a circulatory arrest at a critical stage of the surgery and necessity of beginning reanimation and rescue conversion to the extracorporeal circulation, which significantly reduces risk of postoperative complications such as: death, heart failure, cardiac infarct, multiorgan failure caused by a low output syndrome.

The probe according to the invention may also find application in operations other than coronary artery bypassing, such as monitoring electric activity of the heart exposed to a cardioplegic solution (at intracardiac surgery of cardiac valves and congenital diseases), intraoperative diagnostics of acute cardiac failure in every type of a surgery in patients with non-diagnostic ECG recording from the body surface or operations of the heart with the use of a cardiosurgical robot. In the latter kind of operations an access to the heart is provided only by so-called thoracoscopic ports—i.e. incisions about 1 cm in diameter. Due to its properties, which will be described below, the probe according to the invention is flexible and can be squeezed without losing its properties, which provides a possibility to place it even through a small thoracoscopic port.

Moreover, it should be appreciated that the above-indicated and described applications of the probe are only illustrative and the probe according to the invention can be used also among others for intraoperative diagnostics of cardiac muscle necrosis zones by detecting specific characteristics of an electric signal generated by regions of the heart where necrosis appeared (zones of a past cardiac infarct), which can be used to arrive at a decision to make a bypass to a coronary artery in such a region.

Moreover, due to its size and flexibility, as well as freedom of its arrangement, the probe may be used as an epicardial electrode to electrically stimulate the heart, as an element for studying an electric signal from the surface of pulmonary veins in their intrapericardial section and for conducting their electric stimulation, or for an electric mapping of hearts' atria, including a left cardiac auricle, and also for numerous other medical and diagnostic uses not described herein.

Main functionalities of the probe according to the invention include:
- acquiring an ECG signal from the surface of a beating and arrested heart without the necessity of intracardial insertion of an electrode, to eliminate risk of puncturing or injuring the heart wall;
- detection of cardiac ischaemia;
- possibility of noninvasive fixing to the heart surface, based on adhesion without providing additional fixing means, where additionally no negative pressure, nor necessity for breaking tissue integrity, nor use of additional catheter are required, in other words, the solution according to the invention eliminates the need for handling of (providing) an additional adhesive force, since an adhesion mechanism is built-in into the probe and acts automatically in contact with the tissue, and energy for its activation is not delivered externally, wherein fixing to the surface is performed under visual control, in conditions of an open chest, thus avoiding injury (damage) of a structure (e.g. a blood vessel) at the wall of the heart;
- adaptation for acquiring an ECG signal from the surface of every wall of the heart and atrium, to allow freedom of locating the probe, as it does not come into collision with the epicardial tissue;
- possibility of repeated application to the heart surface without a growing risk of an epicardial tissue damage;
- possibility of connecting the probe to any commercial cardiomonitor and displaying an ECG signal continuously on a standard monitor;
- possibility of co-operation of the probe with any type (model) of a heart stabilizer authorized for human use, it can also be utilized during surgery without the heart stabilizer.

DESCRIPTION OF THE FIGURES OF THE DRAWING

The probe according to the invention will be now described in reference to the figures of the drawing, wherein.

DESCRIPTION OF EMBODIMENTS

Different Structures of the Probe

Figure 1:
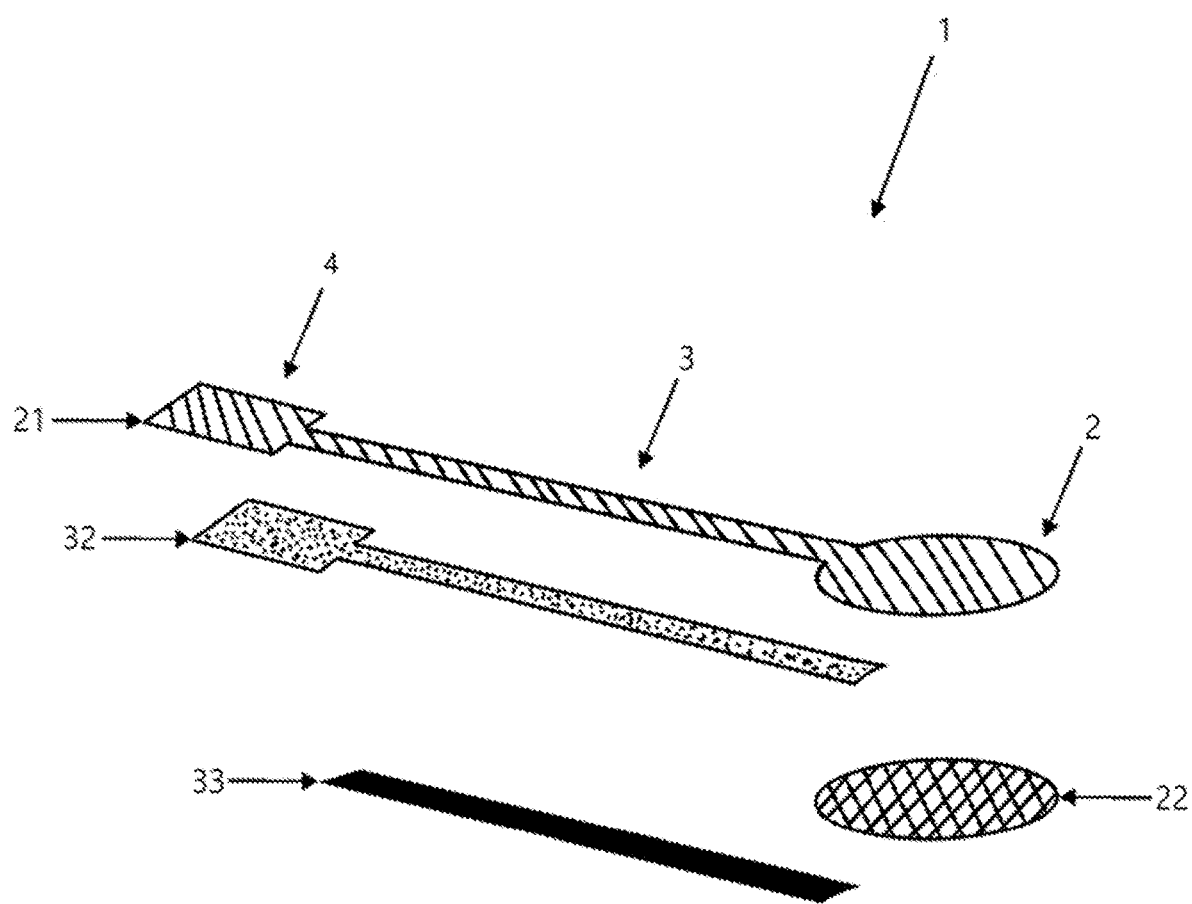
FIG. 1 is the exploded isometric view of the probe according to the invention.
Figure 2:
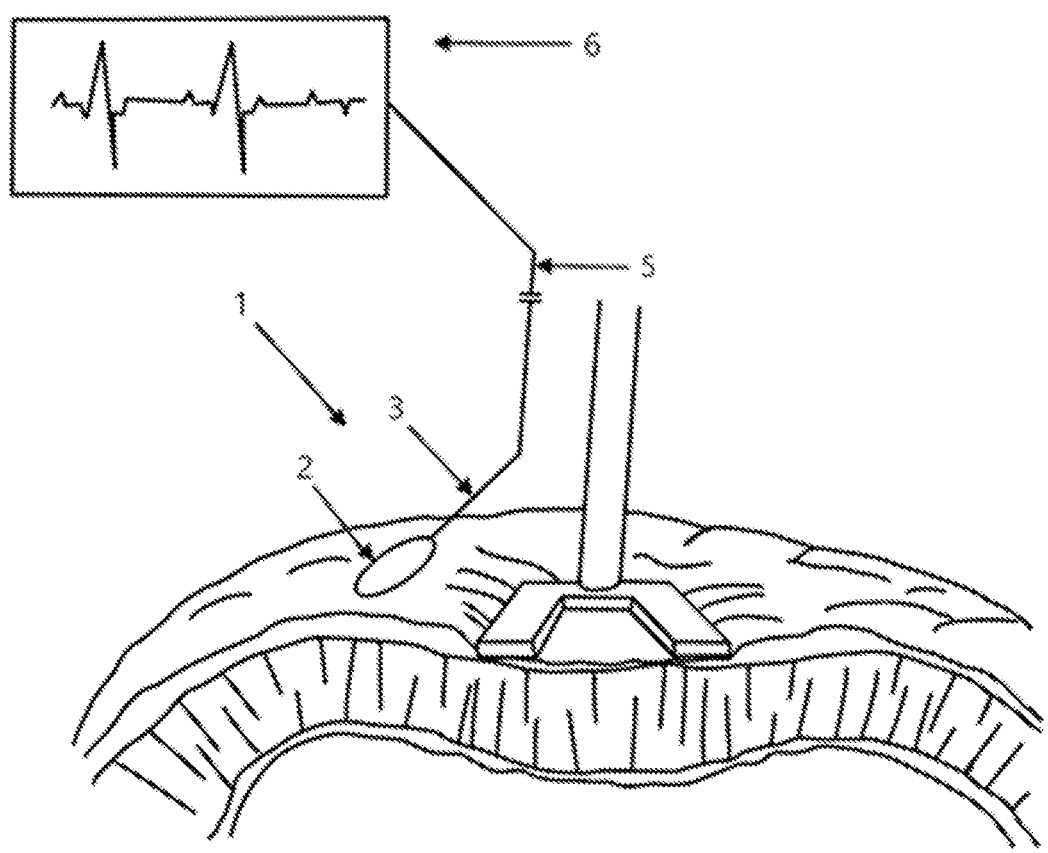
FIG. 2 illustrates a method for positioning the probe according to the invention.
Figure 3:
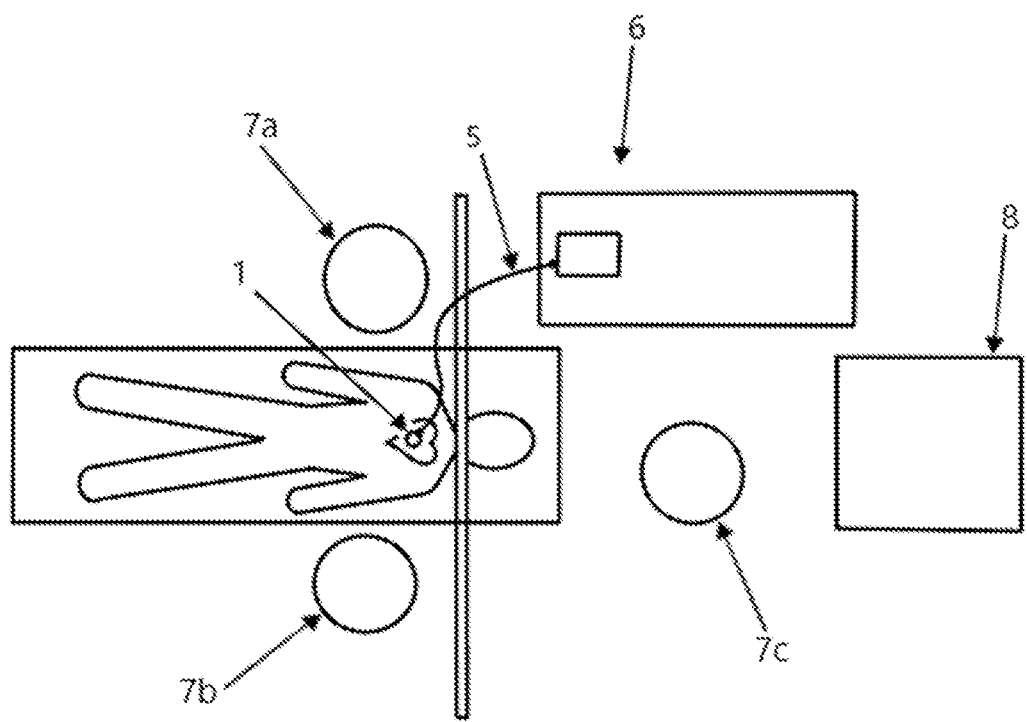
FIG. 3 is the view of an operating room during operation with the use of the probe and measuring system according to the invention, and medical staff and medical equipment provided in the operating room.

The probe 1 according to an embodiment of the invention illustrated in FIG. 1 has a form of a long, narrow, planar, layered element, comprising the measuring element 2, said measuring element 2 is, for example, an element, which in the plane perpendicular to its thickness has a circle-like shape of a diameter in the range of 10 mm to 30 mm, for example 15 mm. In addition, the probe 1 comprises the connecting element 3 in a form of a strip, for example in a rectangular shape, and at an end of the connecting element 3, opposite to the measuring element 2, the connecting fragment 4 is arranged to connect with the signal cable 5. The measuring element 2 and the connecting element 3 are electrically connected and are located in the same plane. The measuring element 2 is configured to measure an electric signal from the surface of the heart, and the connecting element 3 is configured to output signal measured from the surface of the heart. The measuring element 2 comprises the signal-collecting layer 22 distributed on at least a part of the measuring element 2, and the base layer 21 extending over the entire surface of the measuring element 2 and comprising a substrate, onto which the remaining layers are applied, and which serves as an insulation for the signal-collecting layer and for the connecting layer 32, described below, from an external environment of the patient's body. The connecting element 3 comprises the conductive layer 32, the dielectric layer 33 insulating the conductive layer 32, and the base layer 21 extending over the entire surface the connecting element 3. The dielectric layer 33 extends over the entire length of the connecting element 3 of the probe 1 and completely insulates electrically the conductive layer 32 arranged thereon from an external environment, and in particular from the hearts surface, at the entire length of the connecting element 3. The connecting fragment 4 provided at the end of the connecting element 3 comprises the base layer 21 and the conductive layer 32 arranged thereupon.

Figure 4:
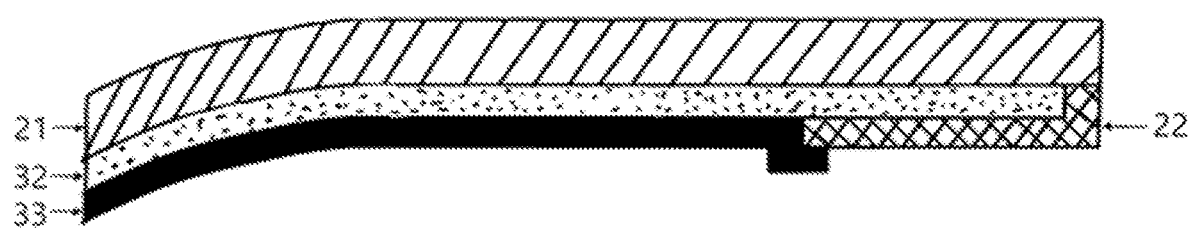
FIG. 4 is the cross-sectional view of the most preferable embodiment of the probe according to the invention, wherein the conductive layer extends over the measuring element.
Figure 5:
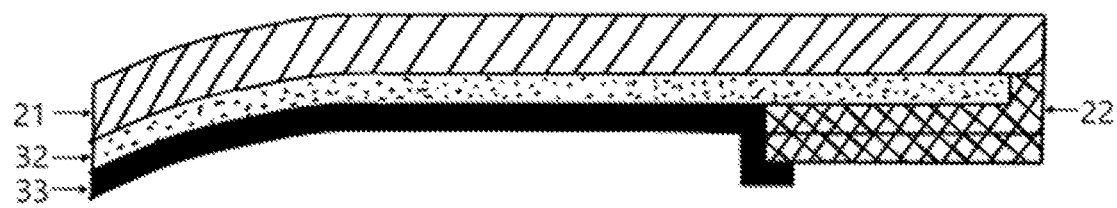
FIG. 5 is the cross-sectional view of the probe of FIG. 4 with the double thickness of the signal-collecting layer.

During tests performed on the various models of the probe, it turned out, that in the most preferred embodiment illustrated in FIGS. 4 and 5, the probe 1 comprises, in the measuring element 2, the base layer 21 and the signal-collecting layer 22 being simultaneously the adhesive layer 23, and in the connecting element 3 comprises the base layer 21 arranged over the conductive layer 31 provided over the dielectric layer 33, wherein said conductive layer 32 of the connecting element 3 extends over the measuring element 2 so that it is arranged in this element between the base layer 21 and the signal-collecting layer 22. In other words, in the measuring element 2 the base layer 21 is arranged over the conductive layer 32, which is provided over the signal-collecting layer 22.

In addition, the conductive layer 32 of the measuring element 2 and the conductive layer 32 of the connecting element 3 are made as one component from a single material and comprise a continuous layer extending on the entire length of both elements 2 and 3. In addition, the measuring element 2 is entirely covered by the base layer 21, which covers the conductive layer 32, and remains of the signal-collecting layer 22 present at edges of the measuring element 2. The most preferred embodiment will be described more broadly in the further part, in connection with the description of the composition of the individual layers.

Below, other possible embodiments of the invention are described.

Figure 6:
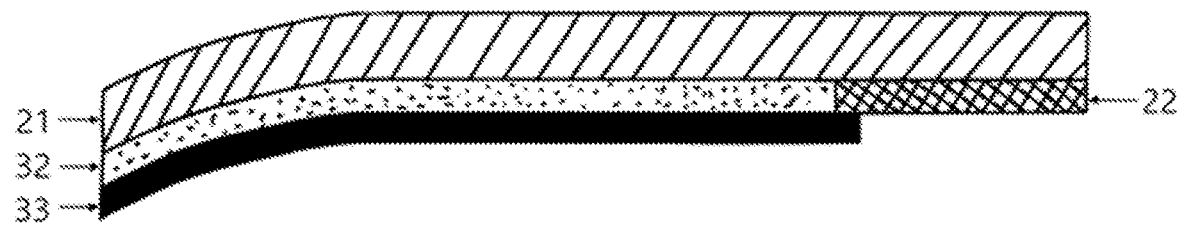
FIG. 6 is the cross-sectional view of one embodiment of the probe according to the invention.
Figure 7:
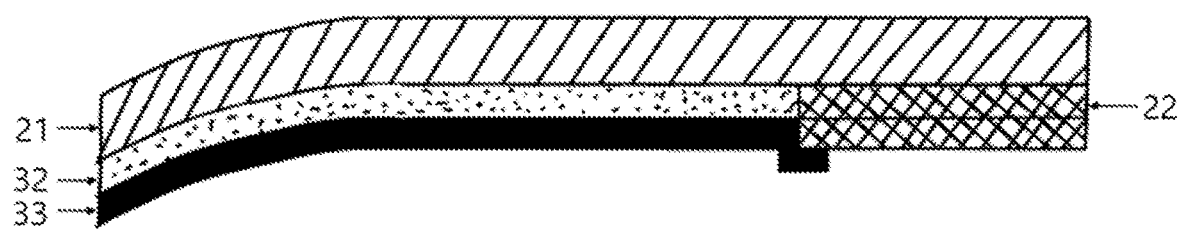
FIG. 7 is the cross-sectional view of the probe of FIG. 6 with the double thickness of the signal-collecting layer.

In the embodiment presented in FIG. 6 and FIG. 7, the probe 1 comprises, in the measuring element 2, the base layer 21 arranged over the signal-collecting layer 22, and in the connecting element 3, the base layer 21 arranged over the conductive layer 32, which in turn is arranged over the dielectric layer 33, and in the connecting fragment 4, the conductive layer 32 arranged over the base layer 21.

Figure 8:
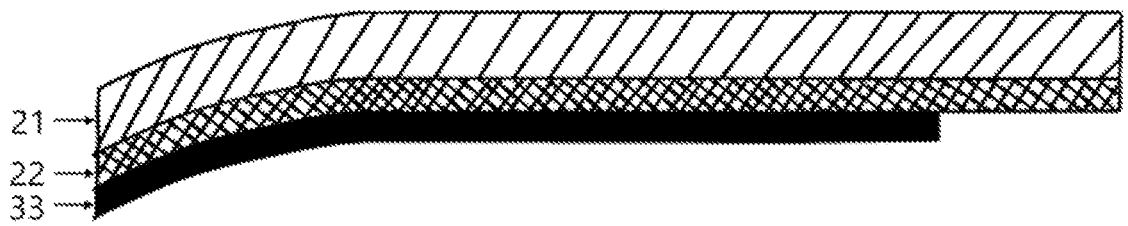
FIG. 8 is the cross-sectional view of an embodiment of the probe according to the invention, wherein the conductive layer and the signal-collecting layer are made of the same material.
Figure 9:
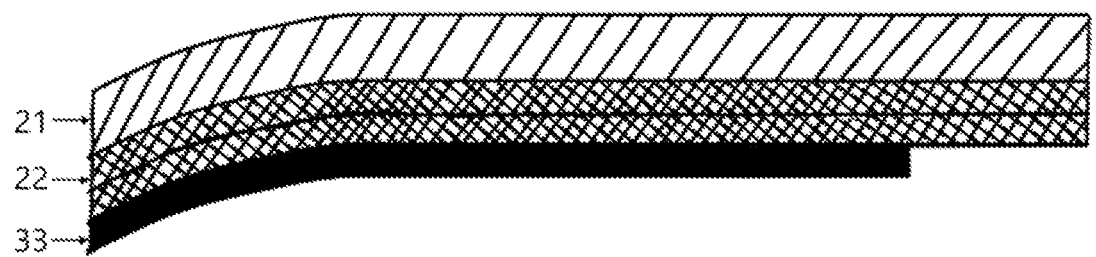
FIG. 9 is the cross-sectional view of the probe of FIG. 8 with the double thickness of the connecting layer and signal-collecting layer.

In another embodiment presented in FIG. 8 and FIG. 9, in the measuring element 2, the base layer 21 is located over the signal-collecting layer 22, and in the connecting element 3, the base layer 21 is located over the conductive layer 32 which is arranged over the dielectric layer 33. Further, the signal-collecting layer 22 of the measuring element 2 and the conductive layer 32 of the connecting element 3 are made of the same material and constitute a continuous layer extending across the measuring element 2 and the connecting element 3. Additionally, the connecting element 3 in the connecting fragment 4 has the conductive layer 32 located over the base layer 21.

Figure 10:
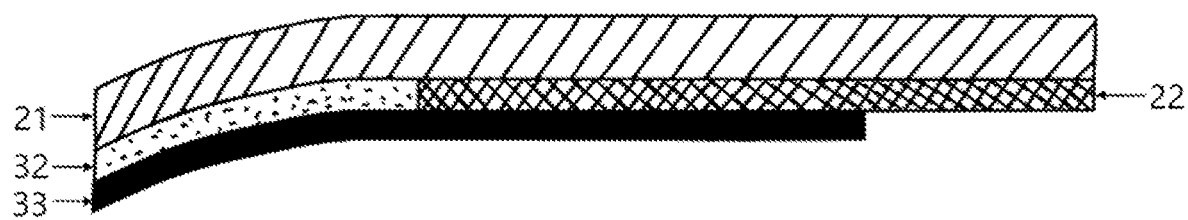
FIG. 10 is the cross-sectional view of an embodiment of the probe according to the invention, wherein the conductive layer extends only over a part of the conductive element, and the signal-collecting layer extends partially over the connecting element.
Figure 11:
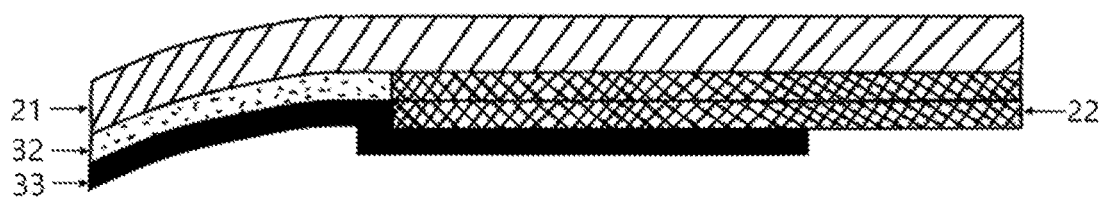
FIG. 11 is the cross-sectional view of the probe of FIG. 10, with the double thickness of the signal-collecting layer.
Figure 12:
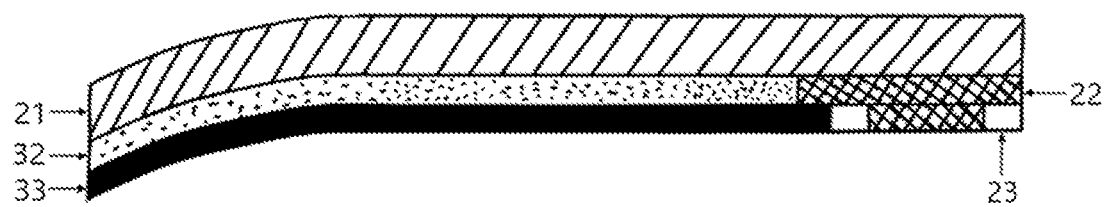
FIG. 12 is the cross-sectional view of the probe of FIG. 6, with the ring-shaped adhesive layer.
Figure 13:
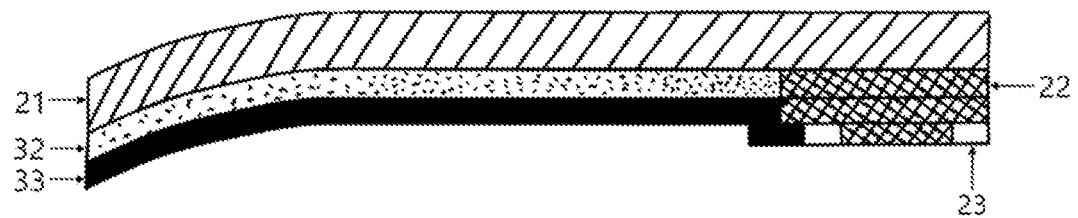
FIG. 13 is the cross-sectional view of the probe of FIG. 7, with the ring-shaped adhesive layer.
Figure 14:
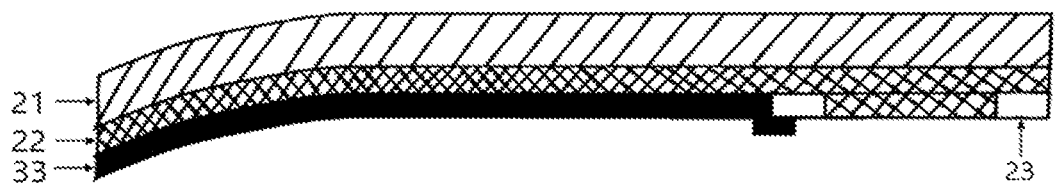
FIG. 14 is the cross-sectional view of the probe of FIG. 8, with the ring-shaped adhesive layer.
Figure 15:
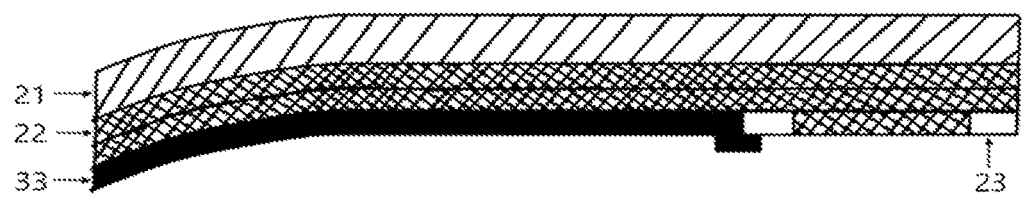
FIG. 15 is the cross-sectional view of the probe of FIG. 9, with the ring-shaped adhesive layer.
Figure 16:
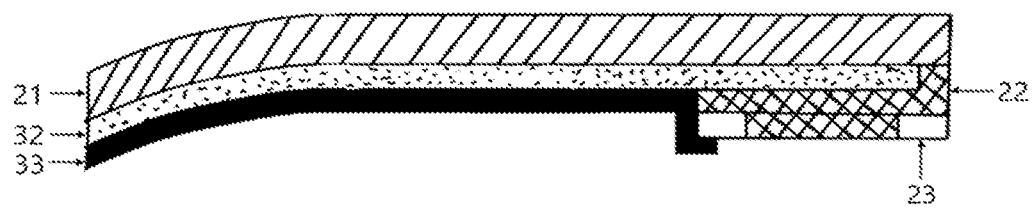
FIG. 16 is the cross-sectional view of the probe of FIG. 4, with the ring-shaped adhesive layer.
Figure 17:
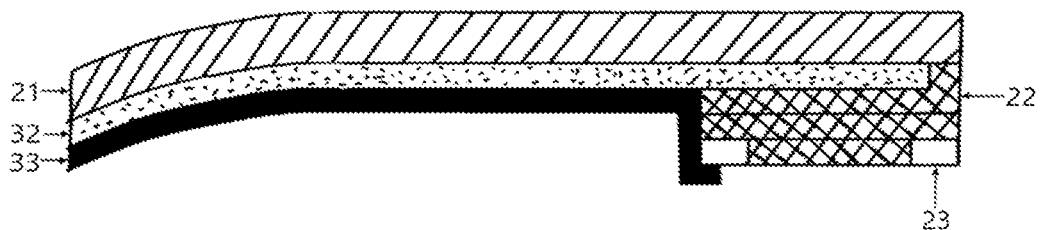
FIG. 17 is the cross-sectional view of the probe of FIG. 5, with the ring-shaped adhesive layer.
Figure 18:
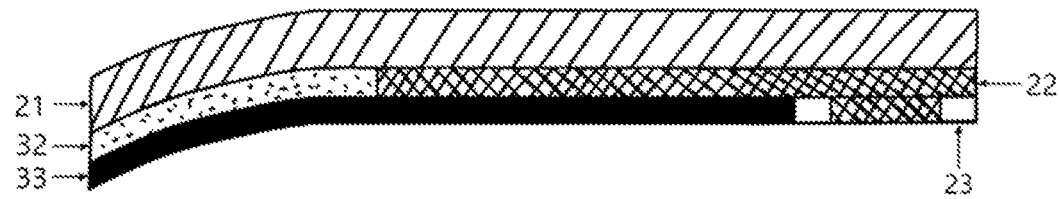
FIG. 18 is the cross-sectional view of the probe of FIG. 10, with the ring-shaped adhesive layer.
Figure 19:
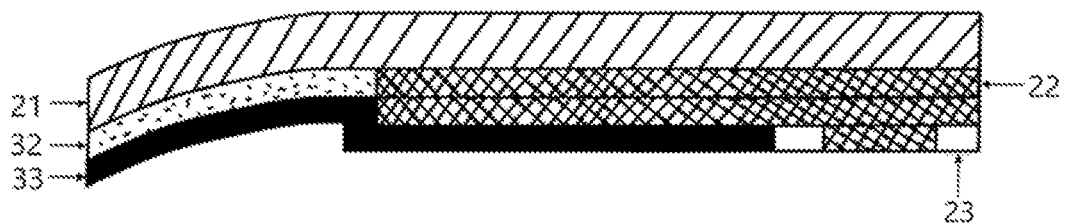
FIG. 19 is the cross-sectional view of the probe of FIG. 11, with the ring-shaped adhesive layer.

In the further embodiment of the invention, presented in FIGS. 10 and 11, the probe 1 comprises, in the measuring element 2, the base layer 21, located over the signal-collecting layer 22, and in the connecting element 3, the base layer 21, located over the conductive layer 32, which in turn is located over the dielectric layer 33, while in the connecting fragment 4, the conductive layer 32 located over the base layer 21. In this embodiment, the conductive layer 32 of the connecting element 3 in section adjacent to the measuring element 2 is made of the same material as the signal-collecting layer 22 of the measuring element 2, the remaining portion being made of another conductive material. In other words, a part of the connecting layer 32 of the connecting element 3 is the signal-collecting layer 2, which constitutes one layer with the signal-collecting layer 22 of the measuring element 2. FIG. 11 illustrates the embodiment, wherein the signal-collecting layer 22 having the double thickness is located in the measuring element 2 and in a part of the connecting element 3, but an embodiment wherein the signal-collecting layer 22 having the double thickness is located in the measuring element 2 only is also possible.

In an alternative variant of each of the embodiments described above, the signal-collecting layer 22 of the measuring element 2 overlaps partially the dielectric layer 33 of the connecting element 3.

In another variant of each of the embodiments described above, the signal-collecting layer 22 can comprise simultaneously, like in the most preferred embodiment, the adhesive layer 23.

In a subsequent variant of each of the embodiments described above, in the measuring element 2, the signal-collecting layer 22 is located over the adhesive layer 23, and in another embodiment the adhesive layer 23 is located at the periphery of the measuring element 2, partially covering the signal-collecting layer 22.

In another variant of an embodiment of the invention the probe 1 of the above embodiments comprises additionally, in the measuring element 2, the ring-shaped adhesive layer 23, located at the perimeter of the measuring element 2, as illustrated in FIGS. 12-19.

In the embodiments above, the base layer 21 of the measuring element 2, the connecting element 3 and the connecting fragment 4 is preferably made from one element.

Composition of the Probe

In the description of the composition of the probe according to the invention, a "derivative" should be understood as any chemical compound, which was prepared by replacing one or more atoms in a molecule by a functional group (by changing the structure) or a group of other atoms. A "matrix" is a continuous phase, in which functional phase particles are suspended, wherein the matrix provides different corresponding physical parameters than the functional phase particles, for example, a polymer in which graphene flakes are suspended, as the matrix provides flexibility, while the flakes comprising the functional phase particles provide conductivity of the layers. A "carrier" is the matrix in the liquid state, before being hardened.

In the description, compositions of pastes and layers are described before solvents are evaporated, unless stated otherwise. After the evaporation, the amount of solvent in a paste is negligible or zero. Weight ratios of solvents in relation to polymers before evaporation are described in the subsection titled "Exemplary process of manufacturing of the probe".

In the embodiments of structures of the probe 1 described above, all the layers are made of flexible materials.

In the embodiments of structures of the probe 1 described above, the base layer 21 is made, for example, from a PET film.

In the subsequent embodiment, the dielectric layer 33 and the base layer 21 are made of the same material.

In the preferred embodiment illustrated in FIGS. 4 and 5 the signal-collecting layer 22, which is simultaneously the adhesive layer 23, is a layer further referred to in the description as a "graphene-TPU" layer, and the conductive layer 32 is a layer further referred to in the description as a "graphene-PMMA" layer. The "graphene-TPU" layer in the most preferred variant comprises a thermoplastic polyurethane elastomer (TPU), a graphene acting as a conductive substance, a hydroxypropyl starch (Lycoat RS720 starch) which is a starch derivative and acts as an adhesion promoter and a solvent. In the embodiment, the preferred proportions are 80% by weight of a thermoplastic polyurethane elastomer TPU as a paste (in the form of the paste), 10% by weight of the Lycoat RS720 starch and 10% by weight of graphene, as graphene flakes.

In the embodiment presented in FIG. 6, FIG. 7, FIG. 12, FIG. 13, FIG. 16 and FIG. 17 the signal-collecting layer 22 in the measuring element 2 is a layer referred to in the description as a "graphene layer", and in another embodiment presented in FIG. 8, FIG. 9, FIG. 14 and FIG. 15 the graphene layer is also the conductive layer 32 in the connecting element 3. However, in the embodiment presented in FIG. 10, FIG. 11, FIG. 18 and FIG. 19, the signal-collecting layer 22 in the measuring element 2 and a part of the connecting layer 32 in the connecting element 3 are a graphene layer, and in the remaining part the conductive layer 32 of the connecting element, distal from the measuring element 2, is, for example, a silver layer. Obviously, the solution is not limited to the case where the signal-collecting layer 22 is a graphene layer, and the conductive layer 32 is a silver layer, as discussed hereinbelow.

The graphene layer, in another variant, comprises sodium alginate, graphene and poly(methyl methacrylate) in butyl carbitol acetate. The alginate level is in the range of 10-20% by weight, and more specifically can be in the range of 10-12% by weight. In one embodiment the preferred proportions are 10% by weight of sodium alginate, 13% by weight of graphene and 77% by weight of poly(methyl methacrylate), in butyl carbitol acetate. In an alternative variant of said embodiment the preferred proportions to 12% by weight of sodium alginate, 13% by weight of graphene and 75% by weight of poly(methyl methacrylate) in butyl carbitol acetate.

In another variant of the embodiment, the graphene layer comprises agar, graphene and poly(methyl methacrylate) in butyl carbitol acetate.

In yet another variant, the graphene layer comprises graphene and poly(methyl methacrylate) in butyl carbitol acetate.

In the embodiments above illustrated in figures from 4 to 7, and also from 10 to 13 and from 16 to 19, it is possible that the conductive layer 32, is at least partially, a layer referred to in the description as a silver layer, which, for example, is made of silver microflakes with a flake diameter, for example, 25 μm and a thickness of less than 10 nm, in a matrix. The matrix is a poly(methyl methacrylate) solution in butyl carbitol acetate. The exemplary silver layer comprises 70% by weight of silver microflakes and 30% by weight of poly(methyl methacrylate) in butyl carbitol acetate. Use of the silver microflakes in the conductive layer enhances significantly the strength of a signal transmitted by the probe, however, use of the most preferable embodiment of the invention without said silver layer guarantees sufficient conducting properties necessary for attaining the objects of the invention.

In the embodiments, the thickness of the dielectric layer 33, signal-collecting layer 22 and connecting layer 32 is 10-15 μm, and in the embodiments, wherein the signal-collecting layer 22 is a graphene layer, graphene-TPU layer or graphene-PMMA layer, the thickness thereof is in the range of 10-30 μm, since graphene, graphene-TPU and graphene-PMMA layers can be made as single or double layers (having the double thickness).

The thickness of the base layer 21 in the embodiments is in the range of 40-75 μm.

In the embodiments, the signal-collecting layer 22 comprises at least one carrier, a conductive substance and optionally at least one adhesion promoter, wherein the adhesion promoter is one substance selected from: lanolin, agar, sodium alginate, collagen, gelatin, and starch and cellulose, and derivatives thereof, such as carboxymethyl cellulose, carboxymethyl starch or hydroxypropyl starch (Lycoat RS720 starch) or a mixture thereof; the conductive substance is at least one selected from: Au, Ag, PdAg, graphite, graphene, $RuO_2$, $IrO_2$, $Bi_2Ru_2O_7$, ITO or a mixture thereof; and the carrier is a polymer compound with a solvent, or a resin with a solvent.

In the embodiments, in which a carrier of signal-collecting layer 22 and/or connecting layer 32 is a polymer compound with a solvent, the polymer is one selected from: ethylcellulose, polypropylene, polyethylene, polyesters and polystyrenes, poly(methyl methacrylate) (PMMA), a thermoplastic polyurethane elastomer (TPU), polylactic acid (PLA) or a mixture thereof.

In some embodiments, the conductive layer 32 is preferably a graphene-PMMA layer, which comprises of graphene microflakes of a thickness between 8 and 15 nm and of a diameter more than 2 µm in a matrix. The matrix is a poly(methyl methacrylate) solution (PMMA) in butyl carbitol acetate. In the preferred embodiment, the graphene-PMMA layer comprises 13% by weight of graphene and 87% by weight of poly(methyl methacrylate) in butyl carbitol acetate. Use of graphene secures good conductivity, wherein conduction strength can be adjusted through the amount of graphene added. The diameter of conductive graphene flakes in the preferred embodiment is greater than the thickness of a layer, so individual flakes are able to conduct the signal across the layer, to overcome even high resistance of the layers, and thus a high concentration of graphene flakes is not necessary to achieve required conduction.

For some variants of the probe 1, resistance test of the connecting layer 32 was conducted and it was found that:
when the conductive layer 32 (in the measuring element 2 and the connecting element 3) was a silver layer of about 1 mm width (a shorter dimension perpendicular to thickness), the resistance value was 30±1Ω;
when the conductive layer 32 (in the measuring element 2 and the connecting element 3) was a wide graphene layer (PMMa polymer+graphene) of about 5 mm width, the resistance value was 2.4±0.15Ω;
when the conductive layer 32 (in the measuring element 2 and the connecting element 3) was a thin/narrow graphene layer (PMMa polymer+graphene) of about 1 mm width, the resistance value was 37±1.9Ω.

In the embodiments, the solvent used in a carrier of the signal-collecting layer 22 and/or connecting layer 32 is one selected from: acetone, dimethylformamide (DMF), butyl carbitol acetate (OKB), chloroform, or a mixture thereof.

In the embodiments, the dielectric layer 33 can be a dielectric paste.

In the embodiments, in which the probe 1 comprises a separate adhesive layer 23, said adhesive layer 23 comprises a polymer and an adhesion promoter, wherein a polymer of the adhesive layer 23 is one selected from: ethylcellulose, polypropylene, polyethylene, polyesters and polystyrenes, poly(methyl methacrylate) (PMMA), a thermoplastic polyurethane elastomer (TPU), polylactic acid (PLA) or a mixture thereof, and the adhesion promoter of the adhesive layer 23 is at least one substance selected from: lanolin, agar, sodium alginate, collagen, gelatin, and starch and cellulose and derivatives thereof, such as carboxymethyl cellulose, carboxymethyl starch, hydroxypropyl starch or a mixture thereof.

As mentioned above, in the preferred embodiment, the adhesive layer 23 is one layer with the signal-collecting layer 22.

In one embodiment, the base layer 21 comprises one material selected from: polyethylene terephthalate (PET), polyethylene naphthalate (PEN), polyetheretherketone (PEEK), polycarbonate (PC), polyethersulfone (PES), polyarylate (PAR), polycyclic olefin (PCO) or polynorbornene (PNB), polyimide (PI), a fluoric polyester.

Exemplary Process of Manufacturing of the Probe

The probe 1 of the invention can be manufactured in a printing process, such as the screen-printing technique, on the flexible base layer.

When printing by this technique, the carrier is a polymer dissolved in a solvent, wherein the solvent, after being passed through a suitable screen and settling the carrier on a substrate, for example the base layer 21, evaporates leaving a hardened paste comprising layers of the probe 1.

In the preferred embodiment, screens used for printing, through which inks used for printing are applied, are polyester screens of a density 77-90 T, wherein preferably a gap between the screen and the substrate is about 700 µm, pressure of the squeegee is about 10-50 N, travel speed of the squeegee is preferably 600 mm/min and a squeegee rake is 45 degrees.

While preparing pastes forming the layers of the probe 1 by the screen-printing technique, to make layers of sufficient quality, it is important that the paste has high viscosity, to inhibit its spreading on the screen and to allow printing of precise patterns, which is necessary for creating a probe of accurate dimensions, with simultaneous susceptibility to active shearing forces, influence of which should decrease viscosity of the paste. In other words, viscosity of the paste with growing shear rate decreases significantly—this effect is called shear thinning Following passage of the paste through the screen, the paste settles on the base layer, and the shear rate returns to a low value. At this stage of the screen-printing process, viscosity of the paste rapidly increases and inhibits spreading of the freshly printed pattern, and during the first milliseconds after printing, any unevenness's formed due to mapping the screen on the freshly printed layer are leveled. It is preferred that the paste demonstrates adequate thixotropy (memory of a liquid), and the process of viscosity growing in the paste is not immediate. The paste used for the manufacture of layers by thick-layer techniques should at the shear rate of about 10 s−1 be characterized by viscosity about 50-70 Pa·s, and a slope of the viscosity curve should range from about −0.50 to −0.65.

Viscosity measurements were conducted for composites forming the above-described compositions of the probe 1 versus variable shear rate, and flow curves were determined at constant temperature of 20° C. Pastes with low viscosity, containing less than 3% by weight of graphene, at the whole shear rate range did not demonstrate properties of shear thinning Only in the pastes with a higher graphene content, a distinct increase in viscosity was noted—the pastes with a concentration above 10% by weight of graphene demonstrated very high viscosity, exceeding significantly values accepted for pastes used in the screen-printing technology. Too high viscosity of a composite can hinder application of the paste and cause faded print in the represented layers. Accordingly, in the most preferable embodiment, content of graphene in the "graphene-TPU" layer was set to 10% by weight, where before evaporation of the solvent, the carrier was composed of 10 to 15% by weight of thermoplastic polyurethane elastomer (TPU) dissolved in dimethylformamide (DMF), which constituted 85 to 90% of the carrier, and after evaporation, thermoplastic polyurethane elastomer constituted 80% of the layer, while dimethylformamide evaporated completely.

In the "graphene-PMMA" layer, it was possible to use more graphene due to the greater amount of the solvent in proportion to the polymer. In the most preferred embodiment, graphene content in the "graphene-PMMA" layer was set to 13% by weight, where before evaporation of the solvent, the carrier was composed of 8-10% by weight of poly(methyl methacrylate) (PMMA) dissolved in butyl carbitol acetate (OKB), which constituted 90-92% by weight of the carrier, and after evaporation, poly(methyl methacrylate) constituted 87% of the layer, while butyl carbitol acetate evaporated completely.

To secure appropriate properties of individual layers, it is necessary to select appropriate hardening parameters for printouts.

In the case of the connecting layer 32 and signal-collecting layer 22, solvent inks are appropriate for printing, so evaporation of the solvents is carried out in a thermal chamber dryer. The optimal hardening period and temperature are 120° C. over 30 minutes, said parameters inhibiting degradation of overprints.

In the case of the dielectric layer 33, the most practical inks for printing are photosensitive inks, so hardening of the overprints is carried out in a UV dryer. In the case of a UV dryer, suitable advance of a conveyor belt and the lamp power were selected. Optimal advance of a conveyor belt is 50 mm/min, and the lamp power is 100 W.

Fixing of the Probe and Transmission of the Signal

In the course of an operation, the probe 1 is fixed to the heart by applying the signal-collecting layer 22 of the measuring element 2 to the heart surface. Due to adhesive properties provided by the composition of the signal-collecting layer 22/adhesive layer 23 or by the separate adhesive layer 23, and lightness of the probe 1, it sticks easily to the heart by adhesion, causing no damage to the organ surface and providing a non-invasive measurement.

A signal collected by the signal-collecting layer 22 of the measuring element 2 is transmitted through the conductive layer 32 of the connecting element 3 to the connecting fragment 4, where the measuring element 2 of the probe 1 acquires a signal from the heart only through the signal-collecting layer 22, while from the opposite side it is insulated from the operation field by the base layer 21. The connecting element 3 is entirely isolated from the heart and from the operation field by the base layer 21 on the one side and the dielectric layer 33 on the other side. The ECG signal collected from the heart surface is transmitted by the connecting layer 32 to the connecting fragment 4 extending from the connecting element 3 and adapted to connect with the signal cable 5, adapted to connect with a cardiomonitor, which is a part of the measuring system 6.

The probe 1 according to the invention is adapted to be used with any of cardiomonitors utilized in operating rooms, through said dedicated signal cable 5. The end of the probe 1 is connected to the signal cable 5, which in standard techniques of performing operations is fixed to an ECG skin electrode, through the connecting fragment 4.

The connecting fragment 4, arranged at the opposite end, in relation to the measuring element 2 of the probe 1, constitutes a platform, to which the standard signal cable 5 can be attached, e.g. with a so-called spring clip, a kind of a clip known in the art, without punching and damaging the connecting fragment 4. The connecting fragment 4, in the plane perpendicular to its thickness, has preferably a rectangular shape, for example, with dimensions of the base layer 21 of 7 mm×22 mm and dimensions of the connecting layer 32 of 5 mm×20 mm, or has any other arbitrary shape and dimensions sufficient for attaching to it a standard clip described above, to establish a connection between the clip and the conductive layer 32 of the connecting element 3 of the probe 1. As described previously, the connecting fragment 4 is insulated by the base layer 21 from one side only, therefore it is possible to establish this electric connection between the signal cable 5 and the conductive layer 32 of the connecting element 3.

Such connection secures possibility of reading and interpretation of the signal collected directly from the heart surface, as if it would be a standard measurement read from the skin. In this way the probe 1 of the invention relocates ECG monitoring from the skin surface to monitoring from the heart surface. The method of connecting the probe with a cardiomonitor through the connecting fragment 4 guarantees versatility of use, and does not require setting up an additional measuring system 6, that is an electronic circuit and software. Moreover, this method of connecting the probe 1 of the invention with a cardiomonitor guarantees displaying an ECG curve on a cardiomonitor in a standard way known to the medical staff 7a, 7b, 7c and requires neither a separate monitor nor engaging other medical equipment 8. In addition, a cardiomonitor software drawing an electrocardiographic curve, including a shift of the ST segment, can operate in an unaltered way and perform analysis of the ST segment in a manner identical as analysis of a signal transmitted from a skin surface.

The probe 1 has an electric signal resistance adjusted to make the signal collected from the heart surface fully readable for standard cardiomonitor.

The probe 1 is thus suitable for use in ECG monitoring performed according to the monitoring standards used in the clinical practice, by utilizing cardiomonitors with a standard software, which allows to automatically adjust the so-called ECG size (or the size of the presented curve), present the acquired signals simultaneously at the display, and analyze cardiac ischaemia (so-called analysis of the ST segment in an ECG recording).

Attaching the signal cable 5 to the probe 1, due to the sufficiently long connecting element 3, was assured as to inhibit presence of the signal cable 5 in the operating field (an open chest—a pericardial sac). Attaching the signal cable 5 to the probe 1 in the region of the operating field, where gravitational forces act upon it, could cause too much strain to the probe 1 and detachment of the probe 1 from the heart surface caused by the signal cable weight 5 alone, or could bring a risk of the cable falling into the pericardial sac interior, which could also cause patient's injury, tearing the probe off or wetting the cable. Therefore the connecting element 3 of the probe 1 has such length that the end of the probe 1 with the connecting fragment 4 leaves the operation field, and only outside the operative area, the freely lying signal cable 5 is attached to the connecting fragment 4. Preferably the length is more than 10 cm and more preferably it is about 17 cm. This allows to lead out the connecting fragment 4 outside the patient's open chest region, and thereby output electric signal collected from the heart surface outside the operating field, regardless of the heart position and the place of the attachment of the measuring element 2 of the probe 1.

Adhesive properties of the signal-collecting layer 22 and adhesive layer 23 allow to repeatedly change position and location of the probe on the heart surface, by detaching and reapplying the measuring element 2 to the heart surface, without loss of its adhesive properties.

Both conducting and adhesive properties of the layers of the probe 1 were confirmed during tests, the results of which will be presented below.

It should be appreciated that the above-described process for the manufacture of the probe 1 was presented for the illustration only and does not restrict process for making the probe according to the invention. The probe 1 can be made by any equivalent process which will provide the probe 1 of the presented structure.

In another embodiment, the connecting element 3, which transmits signal from the measuring element 2, can be made of any different material, including a non-flexible one, which is able to transmit an ECG signal and which is isolated from an operative area.

All the terms such as "round", "rectangular", "oblong" or the like appearing in the text were given as examples only and do not restrict neither a shape of elements of the probe 1, nor their configuration.

All the embodiments of the probe 1 relate also to the measuring system 6 for epicardial ECG monitoring comprising the probe 1, as described in the description above.

According to an embodiment of the invention, the system 6 comprises the signal cable 5 connecting the probe 1 with a display device, for example a cardiomonitor.

The Probe Test Concerning Quality of Transmitted Signal in Simulated Conditions

Different variants of the embodiment of the probe 1 were tested for stability and quality of conducting a collected signal in various conditions, to select the best connecting layer 32 to use in the probe 1 of the invention.

Results of the tests are presented below.

Tests concerning conductivity were made for:
a) assessing stability of conduction upon change of the position of the measuring element of the probe 1 on stimulators' electrode,
b) ability to maintain conduction in the probe 1 upon its repeated deformation,
c) obtaining a signal with voltage allowing its processing by a cardiomonitor (a criterion of the lack of excessively high resistance to conduction),
d) obtaining a stable signal (a criterion of the lack of a noise which would inhibit obtaining a continuous ECG recording on a cardiomonitor).

The Experiment

The electrophysiological simulator was programmed to generate an electric signal with a characteristics of physiological sinus rhythm at the frequency of 80 beats per minute. Standard ECG electrodes for skin readout were connected to the plate with signal output electrodes. Then one of the electrodes was replaced by a prototype of the probe 1 according to the invention. The prototype was then rotated (moved) over the signal output electrode, manually squeezed and applied again.

In this manner several variants of the probe 1 according to an embodiment of the invention illustrated in FIG. 4 were examined, wherein the signal-collecting layer 22 and the conductive layer 32 are graphene layers or graphene-PMMA layers with a composition indicated below, where graphene is one of the materials from:
  graphene flakes from Cheap Tube with a mean diameter of 25 μm and thickness of 10 nm;
  series M and series H graphene flakes from XG science (US) with thickness of 2 to 8 nm and 15 nm, respectively, and a mean diameter of 5 to 25 μm;
  graphene flakes from Cheap Tube with a mean diameter of more than 2 μm and thickness ranging between 8 and 15 nm.

Electrical tests have shown that the best electrical parameters were demonstrated by layers containing flakes from Cheap Tube, but the alternative could be series M-25 flakes from XG Science of an equally highly developed layer surface, or high roughness of a layer surface, and only slightly lower electrical parameters.

Results

All tested prototypes of the probe 1 according to the invention exhibited ability to conduct an electrocardiographic signal generated by the simulator in the physiological sinus rhythm mode. Regardless of the probe 1 used, the signal was correctly presented by an electrocardiographic monitor. A signal curve was automatically and correctly calibrated by a system (software) of the cardiomonitor built-in into the simulator.

Among all the models tested, electrocardiographic signal was best transmitted by the probe 1 according to the invention, in which the signal-collecting layer 22 was a layer containing the graphene flakes from Cheap Tube in the concentration of 12.5%-13% by weight in a matrix, where poly(methyl methacrylate) in butyl carbitol acetate constituted 8% by weight of the carrier.

Additionally it was found that:
a) turning around the probe 1 according to the invention caused slight disturbance in display covering from 1 to 3 ECG evolutions and stabilized after stopping the movement (rubbing of metallic simulator electrode with the probe 1). Since no electrocardiographic gel nor another conduction enhancing agent was used during the tests, disturbances might either not occur at all on the surface of the beating heart or be entirely negligible.
b) repeated squeezing of the probe 1 did not influence the ability of conducting of the signal in any of the experiments.
c) during several minutes of operation of the probes 1 in fixed position no generation of noise or other disturbances were noted. The probe 1 operated correctly and presented a diagnostic ECG recording.

The Probe Test for Adhesive Force, with Various Adhesion Promoters

Different variants of the probe 1 according to the invention were tested for ability of the probe 1 to remain on tissue surface upon change of position of the probe 1, for force needed to tear off the probe 1 from the tissue and for the probes' 1 macroscopic influence (breaking continuity) on the tissue, applying and tearing off the probe 1. Assessment of the force was conducted manually and dynamometrically, with dynamometers working in the range of 0 to 3 g and the range of 0 to 30 g.

Tests ex-vivo used chicken meat (chicken breast, at the room temperature, wetted with water), which mirrors a cardiac muscle structure.

12 variants of an embodiment of the probe 1 illustrated in FIG. 4 were examined.

Model A is the embodiment of the probe 1 illustrated in FIG. 4, wherein the signal-collecting layer 22/the adhesive layer 23 is a graphene layer, where a composition of the graphene layer differs among tested model variants.

Model B is the embodiment of the probe 1 illustrated in FIG. 4, wherein the signal-collecting layer 22/the adhesive layer 23 is a graphene-TPU layer and the conductive layer 32 is a graphene-PMMA layer.

Eleven prototypes of model A of the probe 1 according to the invention in the given embodiment, in which the measuring element 2 was 20 mm in diameter and prototypes differed among themselves in a composition of the graphene layer, constituting the signal-collecting layer 22, and one prototype of the model B of the probe 1, in which the measuring element 2 was 20 mm in diameter, were tested. The tested compositions are presented below:

Model A:
1. A paste of poly(methyl methacrylate) with 1% by weight of lanolin added (1% by weight of lanolin+13% by weight of GNP (graphene)+86% by weight of a poly(methyl methacrylate) carrier in butyl carbitol acetate);
2. A paste of poly(methyl methacrylate) with 2% by weight of lanolin added (2% by weight of lanolin+13% by weight of GNP (graphene)+85% by weight of a poly(methyl methacrylate) carrier in butyl carbitol acetate),
3. A paste of poly(methyl methacrylate) with 5% by weight of lanolin added (5% by weight of lanolin+13% by weight of GNP (graphene)+82% by weight of a poly(methyl methacrylate) carrier in butyl carbitol acetate),
4. A paste of poly(methyl methacrylate) with 1% by weight of agar added (1% by weight of agar+13% by weight of GNP (graphene)+86% by weight of a poly (methyl methacrylate) carrier in butyl carbitol acetate),
5. A paste of poly(methyl methacrylate) with 2% by weight of agar added (2% by weight of agar+13% by weight of GNP (graphene)+85% by weight of a poly (methyl methacrylate) carrier in butyl carbitol acetate),
6. A paste of poly(methyl methacrylate) with 5% by weight of agar added (5% by weight of agar+13% by weight of GNP (graphene)+82% by weight of a poly (methyl methacrylate) carrier in butyl carbitol acetate),
7. A paste of poly(methyl methacrylate) with 5% by weight of agar added (5% by weight of agar+13% by weight of GNP (graphene)+82% by weight of a poly (methyl methacrylate) carrier in butyl carbitol acetate+2 g of warm water),
8. A paste of poly(methyl methacrylate) with 1% by weight of sodium alginate added (1% by weight of sodium alginate+13% by weight of GNP (graphene)+86% by weight of a poly(methyl methacrylate) carrier in butyl carbitol acetate),
9. A paste of poly(methyl methacrylate) with 2% by weight of sodium alginate added (2% by weight of sodium alginate+13% by weight of GNP (graphene)+85% by weight of a poly(methyl methacrylate) carrier in butyl carbitol acetate),
10. A paste of poly(methyl methacrylate) with 5% by weight of sodium alginate added (5% by weight of sodium alginate+13% by weight of GNP (graphene)+82% by weight of a poly(methyl methacrylate) carrier in butyl carbitol acetate),
11. A paste of poly(methyl methacrylate) with 5% by weight of sodium alginate added (5% by weight of sodium alginate+13% by weight of GNP (graphene)+82% by weight of a poly(methyl methacrylate) carrier in butyl carbitol acetate+2 g of warm water).

Model B:
12. A paste of a thermoplastic polyurethane elastomer (TPU) with 10% by weight of GNP (graphene)+10% by weight of Lycoat RS720 starch (hydroxypropyl starch)+80% by weight of a thermoplastic polyurethane elastomer carrier in dimethylformamide (DMF)

Results

On assessing adhesion of the probe 1 to the tissue, after applying the probe 1 to the tissue surface for each prototype of the probe 1 it was found that the probe 1 adhered to the tissue. Upon changes of the tissue position relative to a substrate for 90 degrees and without use of additional traction all the prototypes of the probe 1 remained on the tissue surface.

On manual assessing of the adhesive force, at tearing off the probe 1 with a force approximating surgical maneuvers on the heart surface, it was found that the probes using lanolin broke off most readily regardless of a percent content of lanolin, however, detachment proceeded too easily. The probes made with use of agar and alginate were holding subjectively stronger, where the probe 1 made with use of a paste containing 5% by weight of alginate was characterized by almost ideal—expected—adhesion and resistance to a manual traction. On the other hand, the model B of the probe 1 containing 10% by weight of graphene and 10% by weight of the Lycoat RS720 starch (the sample No. 12) was characterized by the best adhesion, therefore it is the most preferable implementation of the invention.

Upon dynamometric assessment of adhesive force further tests of tearing the probes off were attempted and the values obtained are presented below.

TABLE 1

Dynamometric results for tear-off tests of the probe 1 according to the model A and model B.

| | | Dynamometer readings - a value where detachment occurred | | | |
|---|---|---|---|---|---|
| No. | Composition of the probe - adhesion promoter used | 1st measure-ment (g) | 2nd measure-ment (g) | 3rd measure-ment (g) | after 1 h |
| 1. | 1% by weight lanolin | 1.9 | 1 | 0.6 | 1 |
| 2. | 2% by weight lanolin | 1.5 | 1 | 1.2 | 3 |
| 3. | 3% by weight lanolin | 3 | 2.5 | | 1.3 |
| 4. | 1% by weight of agar | 1.1 | 2.4 | 3 | 1.5 |
| 5. | 2% by weight of agar | 1 | 2.2 | 2.2 | 2 |
| 6. | 5% by weight of agar | 2 | 1.7 | 2.6 | 3 |
| 7. | 5% by weight of agar + water | 1.5 | 1.6 | 2 | 1.6 |
| 8. | 1% by weight of sodium alginate | 1.9 | 1.3 | 2.6 | 1.5 |
| 9. | 2% by weight of sodium alginate | 3 | 3 | 1.5 | 1 |
| 10. | 5% by weight of sodium alginate | 3 | 3 | 2.3 | — |
| 11. | 5% by weight of sodium alginate + water | 3 | 3 | 2 | — |
| 12. | 10% of Lycoat starch | 18 | 15 | 15 | — |

On assessing macroscopic influence of applying and tearing off the probe 1 on a tissue it was found that in the case of each prototype, no macroscopic tissue damage caused by use of the probe 1 according to the invention was found. None of the prototypes of the probe 1 did disintegrate upon tests of a tearing force, and the signal-collecting layer 22 maintained its continuity.

Thanks to the performed tests, it was confirmed that, together with an increase of a percentage by weight of adhesive additives, an adhesive force to the muscular tissue in the entire measurement area increases, and that even a maximum value of an acting adhesive force does not damage the tissue, to which the probe 1 according to the invention is applied. It was also found during the test that the best adhesive properties are that of the Lycoat starch (hydroxypropyl starch), which was the most efficient adhesion promoter among the tested samples.

Test Regarding the Probe Adhesive Properties Endurance Upon Repeated Application to the Tissue Variants of the probe 1 according to the invention were also examined for adhesive properties endurance during subsequent applications to the tissue.

In ex-vivo tests, chicken meat (chicken breast, at room temperature, wetted with water), which reflects the cardiac muscle structure, was used.

One of the tested variants of the probe 1 was a model C of the probe of FIG. 4, in which the conductive layer 32 was a layer containing silver microflakes in a biocompatible matrix, the base layer 21 was a PET film, and the signal-collecting layer 22/the adhesive layer 23 was a graphene layer with a paste composition of poly(methyl methacrylate) with 10% by weight of sodium alginate added (10% by weight of sodium alginate+13% by weight of GNP (graphene)+77% by weight of a poly(methyl methacrylate) carrier in butyl carbitol acetate), where the measuring element 2 was 20 mm in diameter.

Another tested variant of the probe 1 was the most preferable implementation variant of the probe 1, or the model B of the probe, illustrated also in FIG. 4, wherein the conductive layer 32 was a "graphene-PMMA" layer with a paste composition of poly(methyl methacrylate) (PMMA) with 13% by weight of GNP (graphene)+87% by weight of a poly(methyl methacrylate) carrier in butyl carbitol acetate, containing graphene flakes from Cheap Tube with a mean diameter of more than 2 µm and a thickness in the range between 8 and 15 nm, the base layer 21 was a PET film, and the signal-collecting layer 22 constituting also the adhesive layer 23 was a "graphene-TPU" layer with a paste composition of a thermoplastic polyurethane elastomer (TPU) with 10% by weight of graphene added and 10% by weight of the Lycoat RS720 starch (hydroxypropyl starch) added, where the measuring element 2 was 20 mm in diameter.

Upon testing, the probe 1 was applied to the tissue surface in a lateral position—a surface of the probe 1 was arranged perpendicularly in relation to a substrate and in parallel in relation to a traction force vector. This position corresponds the best to the operative situation of applying the probe 1 to the lateral or bottom wall of the heart in the course of the coronary artery bypass grafting. By use of a dynamometer, a force, at which the probe 1 was torn off the tissue surface, was assessed. Next, the probe 1 was applied again to the tissue in the same position and again a traction was performed. In the experiment, the very same probe 1 was used. As a control measurement, 5-fold application of the probe 1 to the tissue by its side lacking the adhesive layer 23, but of the same diameter, was used. In this manner adhesion produced by the base layer 21 alone comprising a substrate for the measuring element 2 and the connecting element 3, and the connecting fragment 4 was assessed.

Based on the results of previous tests described above it was determined that the adhesive force equal to or less than 5 g is a threshold value for the expected maintaining of the probe 1 upon the surface of the beating heart, and that at this value, tearing the probe 1 off from the tissue occurs at minimal maneuvering, and this value cannot find use in the clinical practice.

Thus it was assumed that at attaining the 5 g value the test will be discontinued and a number of applications obtained to the time of reaching this value will denote a strength of the probe 1 against consecutive applications in the range of maximum number of applications of one probe 1.

Thirty applications to the tissue surface were performed. This number exceed many times the number of planned applications to the heart surface during one operation of the coronary artery bypass grafting. Mean planned number of applications of the probe 1 to the heart in an operative setup equals 5 applications.

Results

In the case of the model C of the probe 1, at the first three measurements, a reduction of the adhesive force from more than 30 g to 25 g was observed. Then, a tendency was observed to further reduce the adhesive force to about 50% of the initial value in the 9th application. Then, the adhesive force was stabilized at the level of about 60% of the initial adhesive force to the 15th measurement. Upon subsequent applications reduction of adhesion to a minimal level of 7 g in 24 applications was noted. In the subsequent applications the adhesive force was higher and it oscillated at the level of about 50% of the initial value. At the last planned application (No. 30) the obtained value was 20 g. In accordance with the protocol, the test of the probe was completed after 30 applications. During the experiment, the adhesive force of the probe 1 not once dropped below the threshold value of 5 g.

In the control study, wherein the probe 1 was applied to the heart with the base layer 21, in 3 of 4 applications, an adhesive force below the threshold value was recorded.

In the case of the model B of the probe 1, at the first 3 measurements the adhesive force value remained the same and oscillated around 25 g (precise results were presented in Table 3). Then a tendency was noted to reduce the adhesive force, but it was observed to fall slower than in the model C of the probe 1—in the case of the model B of the probe 1 the adhesive force of more than 50% of the initial adhesive force was maintained to the last application, and only at the 20th application it dropped to 60% of the initial adhesive force value. Moreover, the model B of the probe 1 maintained stably on a heart surface over the entire assumed testing time and at all heart walls, and edges of the measuring element 2 of the probe 1 did not detach from a heart surface. The values obtained during the test performed for the model C of the probe 1 applied to the heart with the signal-collecting layer 22 and for the model B of the probe 1 applied to the heart with the signal-collecting layer 22 are presented below:

TABLE 2

Dynamometric results for tear-off tests of the probe for the model C of the probe 1.

The probe made of a PMMA paste with 10% by weight of sodium alginate added (10% by weight of sodium alginate + 13% by weight of GNP (graphene) + 77% by weight of the PMMA carrier in OKB) – 20 mm in diameter,   The base layer - PET film

| Measurement No. | Dynamometer readings [g] | Measurement No. | Dynamometer readings [g] | Measurement No. | Dynamometer readings [g] | Measurement No. | Dynamometer readings [g] |
|---|---|---|---|---|---|---|---|
| 1. | <30 | 11. | 15 | 21. | 16 | 1. | 10 |
| 2. | 30 | 12. | 20 | 22. | 11 | 2. | 4 |
| 3. | 25 | 13. | 17 | 23. | 11 | 3. | 4 |
| 4. | 15 | 14. | 17 | 24. | 7 | 4. | 5 |
| 5. | 15 | 15. | 19 | 25. | 13 | | |
| 6. | 15 | 16. | 10 | 26. | 17 | | |

TABLE 2-continued

Dynamometric results for tear-off tests of the probe for the model C of the probe 1.

The probe made of a PMMA paste with 10% by weight of sodium alginate added (10% by weight of sodium alginate + 13% by weight of GNP (graphene) + 77% by weight of the PMMA carrier in OKB) – 20 mm in diameter, The base layer - PET film

| Measurement No. | Dynamometer readings [g] | Measurement No. | Dynamometer readings [g] | Measurement No. | Dynamometer readings [g] | Measurement No. | Dynamometer readings [g] |
|---|---|---|---|---|---|---|---|
| 7. | 8 | 17. | 11 | 27. | 17 | | |
| 8. | 19 | 18. | 12 | 28. | 13 | | |
| 9. | 15 | 19. | 12 | 29. | 22 | | |
| 10. | 15 | 20. | 10 | 30. | 20 | | |

TABLE 3

Dynamometric results for tear-off tests of the probe for the model B of the probe 1.
Heart Sense made of a TPU paste with 10% by weight of Lycoat RS720 added (10% of Lycoat RS720 (a hydroxypropyl starch) + 10% GNP (graphene) + 80% of a TPU carrier w DMF)

| Measurement No. | Dynamometer readings [g] |
|---|---|
| 1. | 25 |
| 2. | 25 |
| 3. | 27 |
| 4. | 20 |
| 5. | 20 |
| 6. | 19 |
| 7. | 20 |
| 8. | 18 |
| 9. | 19 |
| 10. | 19 |
| 11. | 18 |
| 12. | 18 |
| 13. | 17 |
| 14. | 17 |
| 15. | 16 |
| 16. | 16 |
| 17. | 19 |
| 18. | 16 |
| 19. | 18 |
| 20. | 15 |
| 21. | 17 |
| 22. | 14 |
| 23. | 15 |
| 24. | 15 |
| 25. | 15 |
| 26. | 15 |
| 27. | 15 |
| 28. | 15 |
| 29. | 14 |
| 30. | 14 |

During testing, it was found that the probe 1 according to the invention maintains the expected level of adhesive force in a sequence of 30 applications to the tissue regardless of a tested model, where, for the model C of the probe 1 after 4th-5th application the probe 1 exhibits a loss of adhesive force to the level of about 50-60% of the initial value, but still these are values exceeding the minimal value required for maintaining the probe 1, while the model B of the probe 1 maintains adhesive force of more than 50% of the initial value up to the 30th application, but at the 4th-5th application, a decrease in adhesive force of only 20% of the initial value, that is to the level of 80% of the initial value, was observed. Additionally it was found that during the subsequent 30 applications the adhesive force value of the probe 1 in both models of implementation of the probe also does not surpass the minimal required value, and thus the probe 1 does not lose its function. Additionally, when comparing results of the tests of applying the probe 1 to the tissue with the signal-collecting layer 22 to applying with the base layer 21, from 3 to 6-fold higher adhesive values of the model C signal-collecting layer 22 in comparison with applying the probe 1 to the tissue with the base layer 21 were observed.

Test of Adhesiveness Endurance after Sterilization of the Probe

The model B of the probe 1, as the most preferred embodiment of the probe 1 according to the invention, was irradiated with gamma rays to assess maintaining of adhesive capacity of the probe 1 after its irradiation, and the results are shown in the Table below, in comparison with the results of adhesive capacity before irradiation of the probe 1 presented before.

TABLE 4

Dynamometric results for tear-off tests of the probe for the model B of the probe.

| | Dynamometer readings | | | | |
|---|---|---|---|---|---|
| State | 1st measurement (g) | 2nd measurement (g) | 3rd measurement (g) | Sum of the three measurements | Direction of traction of the probe relative to tissue |
| Before irradiation | 18 | 15 | 15 | 16 | 90 degrees |
| After irradiation | 30 | 30 | 30 | 30 | 90 degrees |

Results of the tests indicated univocally that gamma radiation did not deteriorate adhesive properties of the model B of the probe 1 according to the invention. After sterilization, this model was remaining stably on the heart surface over the entire assumed period and at every heart wall. Neither the loss of adhesive capacity of the model upon change of a position, nor the loss of flexibility of the model B of the probe 1 was noted, and this allows to appropriately sterilize the probe according to the invention to make it appropriate for medical use. And also, due to having the best adhesive properties, it is the preferred embodiment of the probe 1 according to the invention. However, it should be appreciated that the most preferred embodiment of the probe was so termed to emphasize adhesive properties of the variant, and it does not exclude use of other above-described variants of the probe.

After performing the irradiation, a part of the test of adhesive properties of the probe, tests of signal conduction and presentation of signal recording on a cardiomonitor (checking cooperation of the probe 1 with a cardiomonitor) were also conducted in the same conditions. The model B of the probe 1, which was irradiated previously with gamma rays in a dose used for sterilization of medical articles, conducted correctly an electric signal from the heart surface, no differences was found in conducting a signal between different subsequent positions of the measuring element 2 at individual heart walls, and the probe did not change its conduction ability with time nor upon change of position. Moreover, after irradiation, the model B of the probe 1 cooperated correctly with a cardiomonitor, where a signal presented on a monitor with an automatic adjustment mode set, was adjusting correctly and did not go off-scale, thus it maintained diagnostic properties necessary for diagnostic use of ECG recording, for assessment of cardiac ischemia.

Biocompatibility of the Probe

The model B of the probe 1 according to the invention, which is thought to be the most preferable variant of an embodiment of the probe 1 according to the invention, based on the tests described above, was also subjected to biocompatibility testing, and namely cytoxicity testing and irritation testing, performed according to ISO EN ISO 10993-5 and EN ISO 10993-10:2015 standards.

All the results of the tests described above indicated that the model B of the probe 1 according to the invention is safe to be used on the heart surface, simultaneously stably remaining at its surface, and confirmed possibility of detecting cardiac ischaemia.

All the embodiments and variants thereof are given only as non-limiting indications concerning the invention and may not in any way limit the scope of protection, which is defined by the patent claims. It should be appreciated that any technical solution used in the probe according to the invention can be implemented by equivalent technologies, while not exceeding the scope of protection.

We claim:

1. A measuring probe for epicardial ECG monitoring, comprises a measuring element (2) for measuring electric signal from a heart, a connecting fragment (4) and a connecting element (3) arranged to output the measured heart signal through the connecting fragment (4), where the measuring element (2) is electrically connected with the connecting element (3), and the connecting element (3) is a layered element containing a conductive layer (32), a dielectric layer (33) insulating the conductive layer (32) and a base layer (21) extending over the entire surface of the connecting element (3), characterized in that the measuring element (2) is a layered element containing a signal-collecting layer (22) located over at least a part of the measuring element (2), and the base layer (21) extending over the entire surface of the measuring element (2), wherein the signal-collecting layer (22) of the measuring element (2) is simultaneously an adhesive layer (23), which allows to fix the probe (1) to the heart, wherein the connecting fragment (4) provided at the end of the connecting element (3), opposite to the measuring element (2), is a layered element containing the conductive layer (32) and the base layer (21), with a maximum dimension of the measuring element (2) perpendicular to its thickness being 30 mm, wherein in the measuring element (2), the base layer (21) is located over the signal-collecting layer (22), and in the connecting element (3), the base layer (21) is located over the conductive layer (32) which is arranged over the dielectric layer (33), wherein the signal-collecting layer (22) of the measuring element (2) and the conductive layer (32) of the connecting element (3) constitute a continuous layer extending across the measuring element (2) and the connecting element (3).

2. The probe according to claim 1, characterized in that the measuring element (2) between the signal-collecting layer (22) and the base layer (21) comprises the conductive layer (32), while in the connecting element (3), over the dielectric layer (33), the conductive layer (32) is arranged, over which the base layer (21) is located, wherein the conductive layer (32) of the measuring element (2) and the conductive layer (32) of the connecting element (3) constitute a continuous conductive layer extending across the measuring element (2) and the connecting element (3).

3. The probe according to claim 1, characterized in that in the measuring element (2), the base layer (21) is located over the signal-collecting layer (22), while in the connecting element (3), over the dielectric layer (33), the conductive layer (32) is arranged, over which the base layer (21) is located, wherein the conductive layer (32) of the connecting element (3) at the section adjacent to the measuring element (2) is made of the same material as the signal-collecting layer (22) of the measuring element (2), the remaining portion being made of another conductive material.

4. The probe according to claim 1, characterized in that the adhesive layer (23) comprises a polymer and an adhesion promoter.

5. The probe according to claim 1, characterized in that the conductive layer (32) in the connecting element (3) is a graphene layer.

6. The probe according to claim 1, characterized in that the conductive layer (32) in the connecting element (3) is a graphene-PMMA layer comprising graphene and poly(m-ethyl methacrylate) in butyl carbitol acetate.

7. The probe according to claim 1, characterized in that the signal-collecting layer (22) in the measuring element (2) is a graphene layer.

8. The probe according to claim 1, characterized in that the measuring element (2) and the connecting element (3) are located in a same plane.

9. The probe according to claim 1, characterized in that the dielectric layer (33) and the base layer (21) are made of the same material.

10. The probe according to claim 1, characterized in that the signal-collecting layer (22) comprises at least one carrier, a conductive substance and at least one adhesion promoter.

11. The probe according to claim 10, characterized in that the adhesion promoter comprises one substance selected from: lanolin, agar, sodium alginate, collagen, gelatin, and starch and cellulose, and derivatives thereof, carboxymethyl cellulose, carboxymethyl starch, hydroxypropyl starch or a mixture thereof.

12. The probe according to claim 10, characterized in that the conductive substance is at least one selected from: Au, Ag, PdAg, graphite, graphene, $RuO_2$, $IrO_2$, $Bi_2Ru_2O_7$, ITO or a mixture thereof.

13. The probe according to claim 10, characterized in that the carrier is a polymer compound with a solvent, or a resin with a solvent, wherein the polymer is one selected from: ethylcellulose, polypropylene, polyethylene, polyesters and polystyrenes, poly(methyl methacrylate) (PMMA), a thermoplastic polyurethane elastomer (TPU), polylactic acid (PLA) or a mixture thereof, wherein the solvent is one selected from: acetone, dimethylformamide (DMF), butyl carbitol acetate (OKB), chloroform or a mixture thereof.

14. The probe according to claim 1, characterized in that the base layer (21) comprises one material selected from: polyethylene terephthalate (PET), polyethylene naphthalate (PEN), polyetheretherketone (PEEK), polycarbonate (PC), polyethersulfone (PES), polarylate (PAR), polycyclic olefin (PCO) or polynorbornene (PNB), polyimide (PI), a fluoric polyester or copolymers thereof.

15. The probe according to claim 1, characterized in that the thickness of each of the following layers: the dielectric layer (33), the signal-collecting layer (22), the connecting layer (32), is in a range of 10-15 µm.

16. A measuring probe for epicardial ECG monitoring, comprises a measuring element (2) for measuring electric signal from a heart, a connecting fragment (4) and a connecting element (3) arranged to output the measured heart signal through the connecting fragment (4), where the measuring element (2) is electrically connected with the connecting element (3), and the connecting element (3) is a layered element containing a conductive layer (32), a dielectric layer (33) insulating the conductive layer (32) and a base layer (21) extending over the entire surface of the connecting element (3), characterized in that the measuring element (2) is a layered element containing a signal-collecting layer (22) located over at least a part of the measuring element (2), and the base layer (21) extending over the entire surface of the measuring element (2), wherein the signal-collecting layer (22) of the measuring element (2) is simultaneously an adhesive layer (23), which allows to fix the probe (1) to the heart, wherein a connecting fragment (4) provided at the end of the connecting element (3), opposite to the measuring element (2), is a layered element containing the conductive layer (32) and the base layer (21), with the maximum dimension of the measuring element (2) perpendicular to its thickness being 30 mm, and
wherein in the measuring element (2), the adhesive layer (23) is a graphene-TPU layer comprising graphene, hydroxypropyl starch and a thermoplastic polyurethane elastomer in dimethylformamide.

17. The probe according to claim 16, characterized in that the graphene-TPU layer comprises 10% by weight of graphene, 10% by weight of hydroxypropyl starch and 80% of a thermoplastic polyurethane elastomer in dimethylformamide.

18. The probe according to claim 16, characterized in that the conductive layer (32) in the connecting element (3) is a graphene layer.

19. The probe according to claim 16, characterized in that the signal-collecting layer (22) in the measuring element (2) is a graphene layer.

20. The probe according to claim 16, characterized in that the measuring element (2) and the connecting element (3) are located in a same plane.

21. The probe according to claim 16, characterized in that the signal-collecting layer (22) comprises at least one carrier, a conductive substance and at least one adhesion promoter.

22. The probe according to claim 21, characterized in that the adhesion promoter comprises one substance selected from: lanolin, agar, sodium alginate, collagen, gelatin, and starch and cellulose, and derivatives thereof, carboxymethyl cellulose, carboxymethyl starch, hydroxypropyl starch or a mixture thereof.

23. The probe according to claim 21, characterized in that the conductive substance is at least one selected from: Au, Ag, PdAg, graphite, graphene, $RuO_2$, $IrO_2$, $Bi_2Ru_2O_7$, ITO or a mixture thereof.

24. The probe according to claim 21, characterized in that the carrier is a polymer compound with a solvent, or a resin with a solvent,
wherein the polymer is one selected from: ethylcellulose, polypropylene, polyethylene, polyesters and polystyrenes, poly(methyl methacrylate) (PMMA), a thermoplastic polyurethane elastomer (TPU), polylactic acid (PLA) or a mixture thereof,
wherein the solvent is one selected from: acetone, dimethylformamide (DMF), butyl carbitol acetate (OKB), chloroform or a mixture thereof.

25. The probe according to claim 16, characterized in that the base layer (21) comprises one material selected from: polyethylene terephthalate (PET), polyethylene naphthalate (PEN), polyetheretherketone (PEEK), polycarbonate (PC), polyethersulfone (PES), polarylate (PAR), polycyclic olefin (PCO) or polynorbornene (PNB), polyimide (PI), a fluoric polyester or copolymers thereof.

26. The probe according to claim 16, characterized in that the thickness of each of the following layers: the dielectric layer (33), the signal-collecting layer (22), the connecting layer (32), is in a range of 10-15 µm.

* * * * *